United States Patent [19]

Reid

[11] Patent Number: 4,847,545
[45] Date of Patent: Jul. 11, 1989

[54] METHOD AND AN APPARATUS FOR BOOSTING BATTERY

[76] Inventor: Donald Reid, 4000 de Maisonneuve, apt. 2005, Montreal, Quebec, Canada, H3Z 1J9

[21] Appl. No.: 126,612

[22] Filed: Nov. 30, 1987

[30] Foreign Application Priority Data

Oct. 27, 1987 [CA] Canada .................. 550331

[51] Int. Cl.$^4$ .............................................. H02J 7/00
[52] U.S. Cl. ...................................... 320/2; 307/10.1; 320/6; 320/39; 320/51; 320/25
[58] Field of Search ............... 322/25, 28; 320/2, 32, 320/25, 6, 7, 51, 39; 307/10 R

[56] References Cited

U.S. PATENT DOCUMENTS

| | | | |
|---|---|---|---|
| 1,094,121 | 4/1914 | Cheney | 338/52 |
| 1,259,206 | 3/1918 | Bliss | 52/727 |
| 1,364,687 | 1/1921 | Bentley | 338/96 |
| 1,520,865 | 12/1924 | Heyer | 324/429 |
| 2,725,488 | 11/1955 | Hueffed et al. | 307/48 |
| 2,729,750 | 1/1956 | Draper et al. | 290/36 R |
| 2,988,720 | 6/1961 | Voorlas | 338/108 |
| 3,051,887 | 8/1962 | Lind | 320/25 |
| 3,105,910 | 10/1963 | Chambers | 307/49 |
| 3,256,474 | 6/1966 | Englund, Jr. | 320/7 |
| 3,281,816 | 10/1966 | Raymond | 340/249 |
| 3,296,515 | 1/1967 | Knauth | 320/24 |
| 3,341,762 | 9/1967 | Rockoff | 320/6 |
| 3,343,057 | 9/1967 | Smith | 320/6 |
| 3,366,837 | 1/1968 | Mester | 317/11 |
| 3,389,324 | 6/1968 | Ballman | 320/25 |
| 3,406,318 | 10/1968 | Harland, Jr. et al. | 361/18 |
| 3,413,487 | 11/1968 | Gershen | 307/127 |
| 3,590,357 | 6/1971 | Reid | 320/7 |
| 3,716,774 | 2/1973 | Lace | 322/25 X |
| 4,525,662 | 1/1985 | Kato et al. | 322/28 |
| 4,613,822 | 9/1986 | Reid | 324/426 |

Primary Examiner—R. J. Hickey
Attorney, Agent, or Firm—Nixon & Vanderhye

[57] ABSTRACT

When boosting a battery, a direct current boosting voltage is applied between the positive and negative terminals of the battery via a pair of cables of predetermined length. In order to supply a boosting voltage of predetermined constant value, a direct current voltage source supplies the boosting voltage to the battery not only through the pair of the cables, but also through a high current adjustable load. Of course, the direct current voltage source supplies a voltage of value higher than the boosting voltage predetermined value. A voltage controller detects the voltage between the ends of the two cables adjacent to the voltage source, and the voltage drop in the pair of cables, and varies the high current adjustable load in response to the detected voltage and voltage drop so as to adjust the boosting voltage at the predetermined constant value.

18 Claims, 3 Drawing Sheets

METHOD AND AN APPARATUS FOR BOOSTING BATTERY

BACKGROUND OF THE INVENTION

1. Field of the invention:

The present invention generally relates to a method of supplying an electric voltage of predetermined value to an electric load via a pair of cables. The invention also relates to a battery booster apparatus for applying, via a pair of cables of predetermined length, a direct current boosting voltage of predetermined value between the positive and negative terminals of a battery, for example the battery of a motor vehicle.

2. Brief description of the prior art:

A widely used method of applying a boosting voltage between the positive and negative terminals of the battery of a motor vehicle is to connect the positive and negative terminals of the battery of the said vehicle to the positive and negative terminals of the battery of another motor vehicle, respectively, via a pair of cables of substantial length.

A drawback of such a method is that the value of the boosting voltage widely varies. Indeed, one skilled in the art can appreciate that the value of the boosting voltage varies with the current flowing in the cables, more specifically with the voltage drop in the cables. If the current in the cables widely varies, the voltage drop in the cables also widely varies, and accordingly the boosting voltage widely varies. It should also be pointed out that variation of the direct current voltage of the boosting battery with the load it supplies also causes variation of the boosting voltage.

OBJECTS OF THE INVENTION

It is therefore an object of the present invention to provide a method of supplying an electric voltage of predetermined constant value to an electric load via a pair of cables of predetermined length.

Another object of the present invention is to provide a battery booster apparatus for applying between the positive and negative terminals of the battery of a motor vehicle, a direct current boosting voltage of predetermined constant value via a pair of cables of predetermined length.

SUMMARY OF THE INVENTION

According to one aspect of the present invention there is provided a method of supplying an electric voltage of predetermined voltage value to an electric load via a pair of cables having a predetermined length and both connected at one end thereof to the electric load, comprising the steps of: generating a voltage at the other end of the pair of cables opposite to said one end thereof; detecting the voltage at the other end of the cables; detecting a voltage drop in the pair of cables; and varying the voltage generated at the other end of the cables in accordance with the detected voltage and voltage drop in order to adjust the direct current voltage supplied to the electric load at the predetermined voltage value.

The invention also proposes an apparatus for boosting a battery having a positive and a negative terminals connected to a load circuit by applying between these positive and negative terminals a direct current boosting voltage of predetermined voltage value via a pair of cables having a predetermined length and respectively connected at one end thereof to the positive and negative terminals of the battery, comprising:

input terminal means to be connected to a direct current voltage source means supplying a direct current voltage of value higher than the predetermined voltage value;

output terminal means including two output terminals to be respectively connected to the two cables at the end thereof opposite to said one end;

a high current adjustable load;

circuit means including said input terminal means for connecting the said high current adjustable load in series with the said voltage source means between the two output terminals, whereby the voltage source means can supply through the high current adjustable load and the pair of cables both said boosting voltage between the positive and negative terminals of the battery and a direct current to the battery and load circuit; and boosting voltage controller means comprising (a) a first sensor means for detecting the direct current voltage supplied between the two output terminals by the voltage source means, (b) a second sensor means for producing a signal representative of a voltage drop caused in the pair of cables by the direct current, and (c) means for varying the high current adjustable load in accordance with the detected voltage between the two output terminals and the voltage drop representative signal so as to adjust at the predetermined voltage value the boosting voltage applied between the positive and negative terminals of the battery.

The objects, advantages and other features of the present invention will become more apparent upon reading of the following non-restrictive description of preferred embodiments thereof, given for the purpose of exemplification only with reference to the accompanying drawings, in which:

DETAILED DESCRIPTION OF THE PREFERRED EMBODIMENTS

Figure 1:
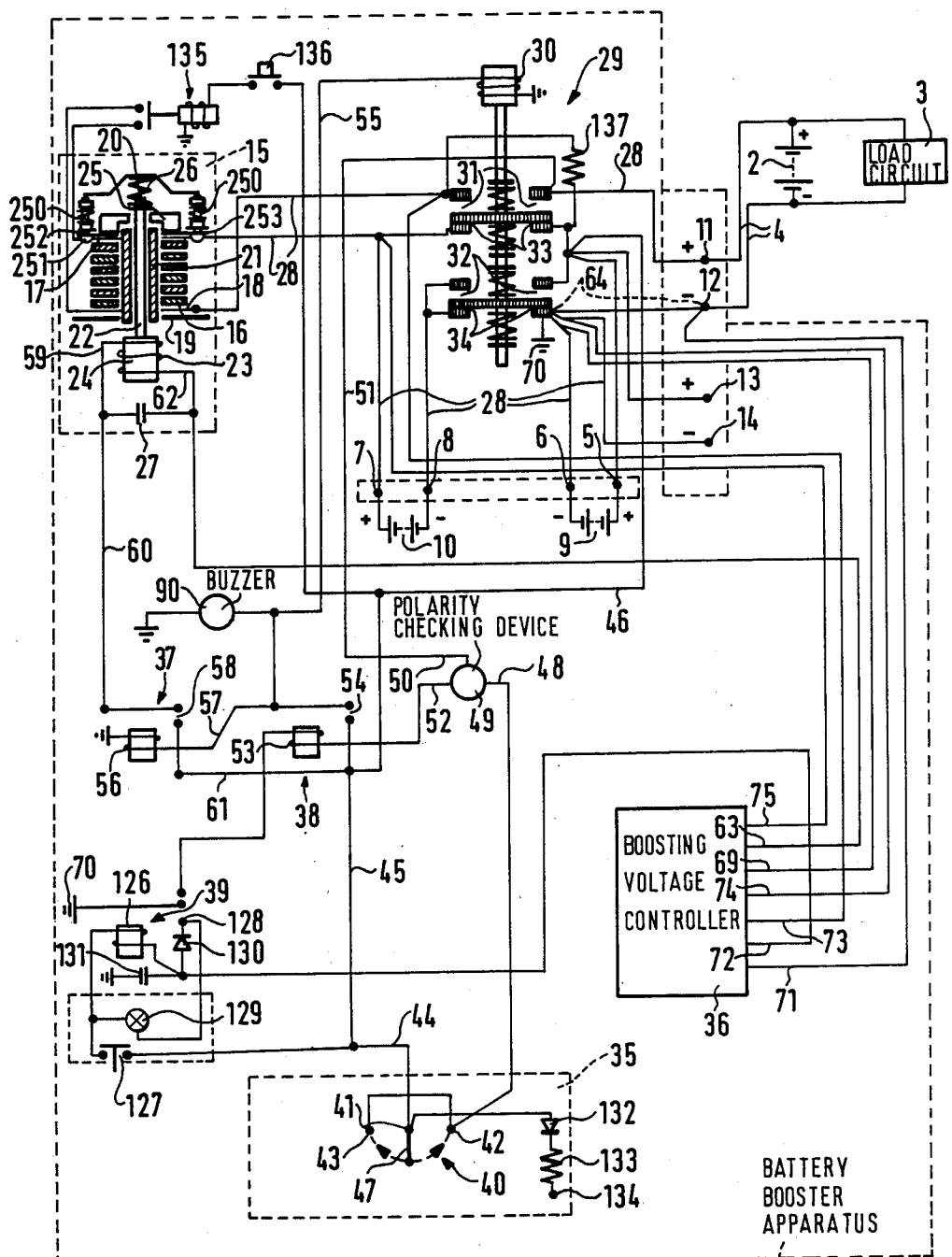
FIG. 1 is a schematic diagram of a first embodiment of a battery booster apparatus according to the invention.

In FIG. 1, there is shown a battery booster apparatus 1 designed both for installation on a service truck and for applying a direct current boosting voltage of predetermined constant voltage value between the positive and negative terminals of a battery 2, connected to a load circuit 3, via a pair of cables 4 of predetermined length.

The battery booster apparatus 1 comprises four input terminals 5, 6, 7 and 8. A first pair of input terminals 5 and 6 are respectively connected to the positive and negative terminals of a first direct current voltage source 9, namely a first battery, while a second pair of input terminals 7 and 8 are respectively connected to the positive and negative terminals of a second voltage source 10, namely a second battery similar to the battery 9. The second voltage source 10 supplies between its positive and negative terminals a direct current voltage of value substantially equal to the value of the direct current voltage supplied between the positive and negative terminals of the first voltage source 9.

In the preferred embodiment of the invention illustrated in FIG. 1, the batteries 2, 9 and 10 are 12-volt batteries.

The battery booster apparatus 1 also comprises four output terminals 11, 12, 13 and 14. A first pair of output terminals 11 and 12 are respectively connected to the corresponding ends of the pair of cables 4 through which the boosting voltage is applied between the terminals of the battery 2.

The battery booster apparatus 1 further comprises a high current adjustable resistive load 15. The load 15 comprises a pile of annular carbon plates 16 disposed between two square, electrically conducting plates 17 and 18. Of course, the latter plates 17 and 18 are not electrically insulated from the upper and lower ends of the pile of annular carbon plates 16, respectively. The plate 18 is mounted on a fixed, metal support plate 19 but is electrically insulated from this support plate, while the conducting plate 17 is mounted on a square movable metal support plate 253 and is also electrically insulated from the latter plate. A movable pressure-applying member 20 is used to apply pressure on the pile of carbon plates 16, as will be seen hereinafter, through the assembly including the plates 17 and 253. Four spring assemblies are mounted on the four corners of the plates 17 and 253 to resist to movement of the two plates 17 and 253 toward the pile of carbon plates 16. As described in detail in U.S. Pat. No. 4,613,822 issued on Sept. 23, 1986 to the Applicant, each spring assembly comprises a screw-and-nut member such as 251 traversing the plates 17 and 253 as well as a portion of frame such as 252 of the load 15. Of course, the member 251 is electrically insulated from the plate 17. A spring such as 250 is mounted on the member 251 between the frame portion 252 and the nut of the screw-and-nut member 251, whereby the four springs resist to any movement of the plates 17 and 253 toward the upper end of the pile of carbon plates 16. A stabilizer spring 26 pushes on the member 20 to cancel the force exerted by the springs 250 on the plates 17 and 253, so that the assembly plate 17 -plate 253 is floating, with the plate 17 separated from the top of the pile of carbon plates 16. The spring 26 also acts as a shock absorber.

It is well known in the art that by varying the pressure applied on the pile of carbon plates 16 in the axial direction thereof, the electric resistance of this pile between the plates 17 and 18 is varied. More specifically, the resistance of the pile of plates 16 reduces when the pressure applied thereon is increased and vice versa.

Accordingly, in order to reduce the resistance of the load 15, a pressure must be applied on the pile of annular carbon plates 16. For that purpose, an assembly including an electrically insulating tube 21, a rod 22, a control coil 23 and a ferromagnetic armature 24 is provided. The tube 21 traverses a central opening of the annular plates 16 of the plates 17, 18, 19 and 253. The tube 21 defines a cylindrical axial passage in which the rod 22 slides lengthwise. In order to allow passage of the rod 22, the pressure-applying member 20 is also provided with an axial opening. A stopper 25 is mounted on the free end of the rod 22, while the other end thereof is attached to the armature 24. When the coil 23 is supplied with a direct current, such a current generates a magnetic field which tends to displace the armature 24 and therefore to pull the rod 22. Pressure is then applied on the pile of annular carbon plates 16 through the stopper 25, the member 20, the electrically conducting plate 17, and the support plate 253. It should be noted here that the control coil 23, the frame portions 252, and the support plate 19 are fixed while the pressure-applying member 20, the rod 22 and the armature 24 are movable.

A protective capacitor 27 is connected in parallel with the control coil 23 to reduce the rate of increase and decrease of the direct current in the coil 23 to prevent production of an overvoltage across the latter coil.

The apparatus 1 also comprises circuit means for connecting the batteries 9 and 10, and the load 15 in series between the terminals 11 and 12 or for disconnecting the batteries 9 and 10 from at least one of these output terminals 11 and 12. In the first case, a direct current can be supplied to the battery 2 and load circuit 3 through the load 15 and the cables 4, which current causes a voltage drop both in the pair of cables 4 and in the load 15.

The circuit means of the battery booster apparatus 1 includes wires 28 and a first relay 29 having a control coil 30, normally open switches 31 and 32 and two normally closed switches 33 and 34. When the control coil 30 is not energized, the switches 31 and 32 are open while the switches 33 and 34 are closed. On the contrary, when the coil 30 is energized the switches 31 and 32 close while the switches 33 and 34 open.

One can therefore appreciate that when the control coil 30 is energized, the batteries 9 and 10 and the high current adjustable load 15 are serially interconnected between the output terminals 11 and 12. When the control coil 30 of the relay 29 is not energized, the batteries 9 and 10 are disconnected from the output terminal 11, whereby no boosting voltage can be supplied through the cables 4. The polarities of the batteries 2, 9 and 10 and of the output terminals 11 and 12 are clearly indicated in FIG. 1.

Figure 2:
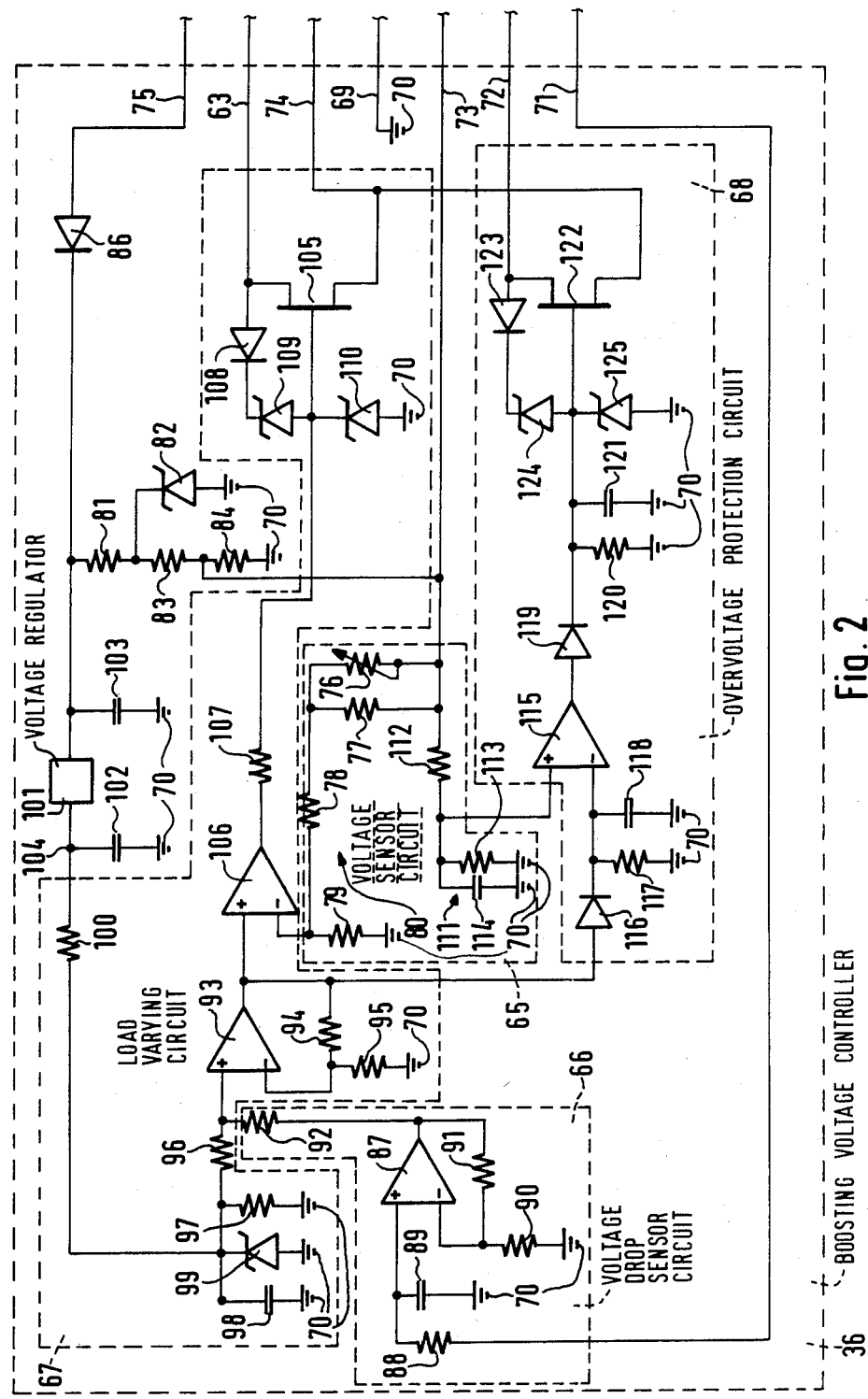
FIG. 2 illustrates the electronic circuit of a voltage controller of the battery booster apparatus of FIG. 1.

A manual switch device 35, a boosting voltage controller 36, and relays 37, 38 and 39 control the operation of the battery booster apparatus 1. The detailed circuit of the controller 36 is shown in FIG. 2.

The switch device 35 comprises a single-pole double-throw toggle switch 40 having a movable blade 47. The switch 40 comprises a first terminal 41 permanently connected both to the blade 47 and to the positive terminal of the battery 9 through current lines 44, 45 and 46. In a first so-called "spring-loaded" position of the switch 40 in which manual pressure is required to maintain the blade 47 and contact 42 of the switch 40 interconnected, or in a second so-called "permanent" position of the switch 40 in which the same can be positioned to interconnect the blade 47 and contact 43 of the switch 40, the direct current voltage from the positive terminal of the battery 9 is supplied to a first input 48 of a polarity checking device 49 having a second input 50 connected through a line 51 to the output terminal 11 and therefore to the positive terminal of the battery 2 to be boosted. If the polarities of the voltages on its inputs 48 and 50 are both positive, the device 49 supplies through its output 52 a control coil 53 of the relay 38 with the voltage on its input 48 to close normally open contacts 54 of the latter relay, and that as long as the switch 40 is manually operated to interconnect the terminal 41 with the contact 42 or 43. The coil 30 of the relay 29 is then energized by the battery 9 through the current line 46, the contacts 54, and a current line 55, to close the switches 31 and 32 to thereby connect the batteries 9 and 10, and the load 15 in series between the output terminals 11 and 12 as explained hereinabove, and that as long as the switch 40 is operated to interconnect the terminal 41 with the contact 42 or 43.

The control coil 30 can therefore be energized to close the switches 31 and 32 only if the polarity of the voltage on the output terminal 11 is positive, i.e. only when the positive and negative terminals of the battery 2 are appropriately connected to the output terminals 11 and through the cables 4.

Moreover, one can appreciate that a boosting voltage is supplied to the battery 2 only when the switch is operated, as the normally open switches 31 and 32 are closed only upon operation of this switch 40. In order to facilitate operation of the battery booster apparatus 1, the switch 40 is advantageously mounted at one end of a cable having its other end connected to the apparatus 1.

Closure of the normally open contacts 54 also causes energizing of a control coil 56 of the relay 37 by the positive terminal of the battery 9 through the line 46, the contacts 54 and a current line 57, the coil 56 having one of its two terminals grounded. Accordingly, energizing of the coil 56 causes closure of normally open contacts 58 of the latter relay 37 so that the control coil 23 of the load 15 has one of its terminals 59 connected to the positive terminal of the battery 9 through a current line 60, the contacts 58, a current line 61 and the line 46. The other terminal 62 of the coil 23 is interconnected with the controller 36 through a line 63.

The battery booster apparatus of FIG. 1 further comprises a portion of cable 64 of calibrated length, which portion of cable 64 is similar to the cables 4. The length of the cable portion 64 being calibrated, the current through the cables 4 flowing through the cable portion 64, and the length of the cables 4 being predetermined, the voltage drop generated across the cable portion 64 by the current flowing in the cables 4 is therefore representative of the voltage drop across the cables 4.

As illustrated in FIG. 2 of the attached drawings, the electronic boosting voltage controller 36 comprises a first sensor circuit 65 for detecting the direct current voltage between the terminals 11 and 12, a second sensor circuit 66 for detecting the voltage drop across the cable portion 64 which is representative of the voltage drop in the cables 4, a circuit 67 for supplying a direct current to the control coil 23 of the high current adjustable load 15 in order to vary this load, and an overvoltage protection circuit 68.

Referring now to FIGS. 1 and 2 of the attached drawings, the electronic circuit of the voltage controller 36 is connected to the negative terminal of the battery 9 through a ground line 69, thereby providing this electronic circuit with a ground 70. The boosting voltage controller 36 is supplied with a 24-volt voltage through a supply line 75 connected to the positive terminal of the battery 10, 10 and that as long as the switches 31 and 32 are closed and the 12-volt batteries 9 and 10 are serially interconnected.

The voltage sensor circuit 65 detects the voltage between the output terminals 11 and 12 through a line 73 and the closed switch 31. The circuit 65 comprises a first voltage divider 80 formed by a potentiometer 76 and three resistors 77, 78 and 79. The function of the divider 80 is to reduce the value of the voltage between the output terminals 11 and 12 so as to produce a feedback voltage of value adjustable through the potentiometer 76 and suitable for use by the load varying circuit 67.

The sensor circuit 66 detects the voltage drop across the cable portion 64 through a voltage line 71. The voltage drop is transmitted to the non-inverting input of an operational amplifier 87 through a low-pass filter formed by a resistor 88 and a capacitor 89. The amplifier 87 has a positive gain adjusted through two resistors 90 and 91. It should be noted here that due to the direction of the current in the cable portion 64, the voltage drop detected through the line 71 is positive, and consequently the amplified voltage representative of the voltage drop in the cable portion 64 at the output of the amplifier 87 is also positive, and is transmitted to the load varying circuit 67 through a resistor 92.

The load varying circuit 67 includes an operational amplifier 93 having a positive gain determined by two resistors 94 and 95. The non-inverting input of the amplifier 95 is both connected to the output of the operational amplifier 87 through the resistor 92 and to a reference voltage through a resistor 96. The reference voltage is generated by a circuit including resistors 97 and 100, a capacitor 98 and a Zener diode 99. The circuit including the resistor 100 and the parallel-connected resistor 97, capacitor 98 and Zener diode 99, as well as the remaining of the electronic circuit of the boosting voltage controller are supplied by the 24-volt direct current voltage on the line 75 through a diode 86, and a voltage regulator 101 associated with two capacitors 102 and 103. The regulator 101 supplies, through its output 104, the controller 36 with a regulated direct current voltage of suitable amplitude.

The amplified voltage at the output of the amplifier 93 is representative of the voltage value between the output terminals 11 and 12 which is necessary to supply between the positive and negative terminals of the battery 2 the boosting voltage of predetermined value (12–14 volt boosting voltage as the battery 2 is a 12-volt battery), i.e. to compensate for the voltage drop in the cables 4. The reference voltage prevents the voltage on the non-inverting input of the amplifier 93 to drop below a minimum value, and consequently the voltage on the output of the amplifier 93 to drop below a minimum value so as to maintain the voltage between the output terminals 11 and 12 above a minimum voltage, for example of about 12 volts.

The load varying circuit 67 further comprises a field effect transistor 105 having its drain electrode connected to the terminal 62 of the control coil 23 of the high current adjustable load 15, through the line 63, its source electrode connected to the negative terminal of the battery 9 through the current line 74, and its gate electrode connected to the output of a comparator 106 of the circuit 67 through a resistor 107. The transistor 105 is biased by means of a diode 108 and of two Zener diodes 109 and 110.

When the feedback voltage produced by the voltage divider 80, representative of the value of the actual voltage between the output terminals 11 and 12, and applied to the inverting input of the comparator 106 is lower than the voltage at the output of the amplifier 93 representative of the desired voltage between the terminals 11 and 12, and applied to the non-inverting input of the comparator 106, the comparator 106 generates on its output a high logic level signal transmitted to the gate of the transistor 105 to turn the same on so that the battery 9 supplies a direct current to the control coil 23 of the load 15 through the line 46, the line 61, the contacts 58, the lines 60 and 63, the junction drain-source of the transistor 105 and the line 74. Supply of the coil 23 with direct current causes a pressure on the pile of carbon plates 16 to reduce the resistance of the load 15, to reduce the voltage drop across the load 15, and to increase the amplitude of the voltage between the output terminals 11 and 12 to the required value. On the contrary, when the feedback signal on the inverting input of the comparator 106 is equal to or higher than the signal on the output of the amplifier 93 supplied to the non-inverting input of the comparator 106, the latter produces on its output a low logic level signal to turn the transistor 105 off and interrupt the current through the control coil 23.

One skilled in the art can therefore appreciate that the value of the direct current voltage between the output terminals 11 and 12 is automatically adjusted to the value required to supply between the positive and negative terminals of the battery 2 the boosting voltage of predetermined amplitude. Indeed, the load 15 is varied to produce therethrough a voltage drop which reduces the 24-volt voltage delivered by the series connected batteries 9 and 10 to a voltage value between the terminals 11 and 12 appropriate to compensate for the voltage drop in the cables 4, whereby a voltage of predetermined value can be applied to the battery 2. Such a predetermined voltage value is adjustable through the potentiometer 76 as the same adjust the level of the feedback voltage produced by the divider 80 and applied to the comparator 106.

The sensor circuit 65 also comprises a second voltage divider 111 formed by a resistor 112 and by another resistor 113 connected in parallel with a capacitor 114. The voltage divider 111 reduces the value of the direct current voltage between the output terminals 11 and 12 to a value suitable for use in the overvoltage protection circuit 68.

The overvoltage protection circuit 68 comprises a comparator 115 having a non-inverting input receiving the direct current voltage produced by the voltage divider 111 of the sensor circuit 65, and an inverting input connected to the output of the amplifier 93 of the load varying circuit 67 through a diode 116 and parallel-connected resistor 117 and capacitor 118. When the voltage on its non-inverting input is higher than that on its inverting input, the comparator 115 generates on its output a high logic level signal transmitted through a diode 119 and parallel-connected resistor 120 and capacitor 121 to the gate electrode of a field effect transistor 122 biased by means of a diode 123 and of two Zener diodes 124, 125. In response to the high logic level signal from the output of the comparator 69, the transistor 122 is turned on, whereby a direct current is supplied by the battery 9 to a control coil 126 of the relay 39 through the lines 46, 45, a push button 127, the line 72, the junction drain-source of the transistor 122, and the line 74. Then, the normally open contacts of the relay 39 are closed so that the contact 128 of the relay 39 is grounded, while the coil 53 of the relay 38 is disconnected from the ground and therefore de-energized to open the contacts 54. The control coils 30 and 56 are thereby de-energized and the normally open switches 31 and 32 and contacts 58 open to de-energize the control coil 23 of the load 15 and to disconnect the output terminal 11 from the batteries 9 and 10.

After turning off of the transistor 122 at the end of the overvoltage situation (opening of the switches 31 and 32), the control coil 126 is still energized by the battery 9 through the lines 46 and 45, the push button 127, and the diode 130 whereby the normally open contacts of the relay 39 remain closed. A capacitor 131 associated with the control coil 126 of the relay 39 has a function similar to that of the capacitor 27 associated with the control coil 23 of the variable load 15.

The function of the three capacitors 114, 118 and 121 is to delay switching on of the transistor 122 in order to prevent the overvoltage protection circuit 68 to cause opening of the contacts 58 and switches 31 and 32 upon occurrence of situations of short duration which do not necessitate such opening. The diodes 116 and 119 prevent the voltage across the capacitors 118 and 121 to influence the output of the amplifier 93 and comparator 115, respectively.

Upon closure of the normally open contacts of the relay 39, an electric lamp 129 is energized by the battery 9 through the lines 46, 45, the push button 127 and the contact 128 connected to the ground, to indicate the overvoltage situation. Upon manual depression of the push button 127, the coil 126 of the relay 39 is de-energized, the normally closed contacts of the relay 39 close while its normally open contacts open, and the electric lamp 129 is de-energized. Then, the coil 53 of the relay 38 is energized, the contacts 54 are closed, and the coils 30 and 56 of the relays 29 and 37 are energized, upon manual operation of the switch 40 in either direction, whereby the battery booster apparatus is reset.

The purpose of the overvoltage protection circuit 68 is therefore to prevent a too high voltage to appear between the output terminals 11 and 12.

A low-resistance power resistor 137 (FIG. 1) is connected between the positive terminal of the battery 9 and the output terminal 11 when the coil 30 is energized and the switches 31 and 32 are closed, that is when the batteries 9 and 10 and the load 15 are connected in series between the output terminals 11 and 12. The resistor 137 has the following functions:

when the current to be supplied to the battery 2 and load circuit 3 is very small, that is for example to supply with direct current a lamp of the motor vehicle associated with the battery 2, such a small current is supplied through the resistor 137, the output terminals 11 and 12 and the cables 4 by the voltage across the battery 9. As the battery 9 is connected to the alternator of the service truck on which it is installed through the output terminals 13 and 14, as will be seen hereinafter, the voltage on the terminal 11, that is the voltage across the battery 9 (about 4 volts) reduced by the voltage drop across the resistor 37, is of such an amplitude that it prevents supply of the coil 23 by the controller 36, whereby no current flows through the load 15 as the plate 17 is separated from the top of the pile of carbon plates 16, as stated hereinabove. This feature of the battery booster apparatus 1 is provided as the pile of carbon plates cannot produce, even with a very small pressure applied thereon, a resistance high enough to cause in response to a very small current a voltage drop across the load 15 sufficient to reduce the voltage between the terminals 11 and 12 to a value suitable to supply the boosting voltage of predetermined value to the battery 2 and load circuit 3;

when the circuit including the cables 4, and the battery 2 and load circuit 3 open, the battery 9 forces through the resistor 137 on line 73 a voltage having an amplitude suitable to prevent the comparator 115 to switch the transistor 122 on and to cause an overvoltage situation, which is not required in this case. As shown in FIG. 2, a circuit including resistors 81, 83 and 84 and a Zener diode 82 helps in causing appearance on line 73 of such a voltage value; and due to its position in the circuit of the booster apparatus 1, the resistor 137 also damps the transcients in the voltage between the output terminals 11 and 12 and in the current supplied to the battery 2 and the load circuit 3.

As shown in FIG. 1 of the attached drawings, the battery booster apparatus 1 can also be provided with a push button 136 and a relay 135 for short-circuiting the high current adjustable load 15 when the batteries 9 and 10 and the load 15 are interconnected in series between the output terminals 11 and 12 so that a voltage equal to the sum of the voltages of the batteries 9 and 10, namely a 24-volt voltage can be applied between the output terminals 11 and 12.

The manual switch device 35 comprises an exciter pin 134 to supply to an external device a voltage through a diode 132 and a resistor 133 when the switch 40 is positioned in any one of its two positions.

As the output terminals 13 and 14 are connected with the alternator and battery of the service truck on which the booster apparatus is installed, and also to the load circuit of this service truck, connection of the battery 9 and of both the batteries 9 and 10 between the contacts 13 and 14 may cause (a) supply of a voltage and current to the battery and the load circuit of the service truck, for example to help to start the engine of the service truck, or recharging by the alternator of the batteries 9 and 10 when the same are connected between the output terminals 13 and 14. It should be remembered here that when the control coil 30 of the relay 29 is energized to close the switches 31 and 32, only the battery 9 is connected between the terminals 13 and 14, while the two batteries 9 and 10 are connected in parallel between the output terminals 13 and 14 when the control coil 30 is de-energized and the switches 33 and 34 are closed.

Advantageously, the end of the cables 4 connected to the terminals of the battery 2 are provided with conventional terminal clamps to allow easy connection and disconnection of these cables 4 to and from the positive and negative terminals of the battery 2.

Figure 3:
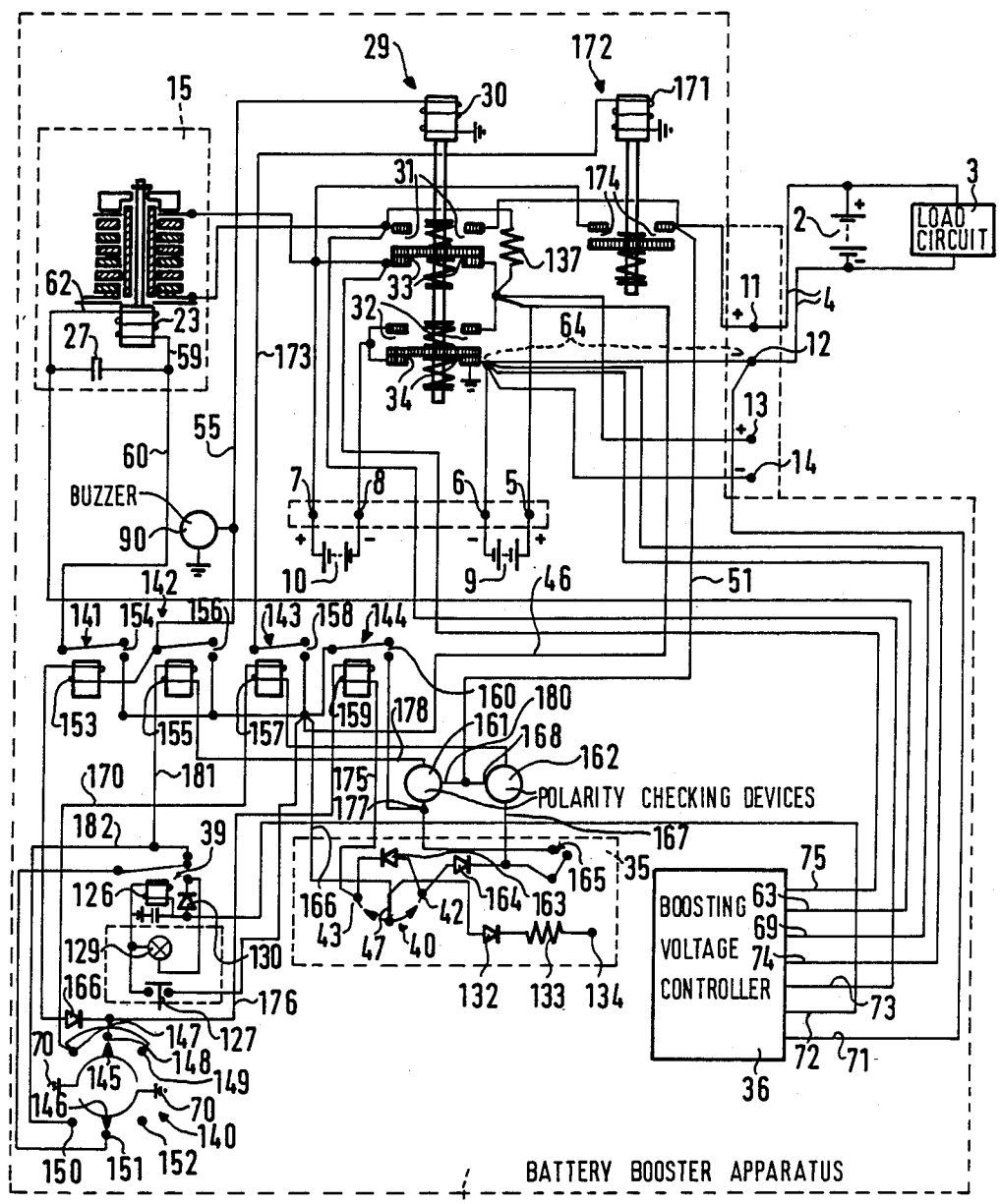
FIG. 3 is a schematic diagram of a second embodiment of the battery booster apparatus according to the invention.

FIG. 3 illustrates a second embodiment of the battery booster apparatus according to the invention. The elements of the apparatus of FIG. 3 which correspond to elements of the battery booster apparatus of FIG. 1 are identified by the same reference numerals.

The battery booster apparatus 1 of FIG. 3 comprises a selector switch 140 for selecting operation of at least one relay among the relays 141, 142, 143 and 144. The selector switch 140 comprises grounded, movable blades 145 and 146 and stationary contacts 147, 148, 149, 150, 151 and 152.

In a first position of the selector switch 140, that is when the blade 145 is positioned on the contact 148 and the blade 146 on the contact 151, manual operation of the switch 40 to push its movable blade 47 on the contact 42 ("spring-loaded" position of the switch 40), the battery 9 energizes a control coil 159 of the relay 144 through the line 46, the blade 47 and contact 42, a diode 163, lines 175 and 176, the contact 148 and the movable blade 145. The normally open contacts 160 then close to cause supply by the battery 9 of an input 177 of a polarity checking device 161 through the line 46 and the contacts 160. When the voltage on the output terminal 11 transmitted by the line 51 to an input 180 of the device 161 is of the same polarity as the voltage on the input 177, the polarity checking device 161 energizes a control coil 155 of the relay 142 through its output 178., the normally closed contacts of the relay 39, the contact 151 and the movable blade 146 of the switch 140. The normally open contacts 156 then close whereby the control coil 30 of the relay 29 is energized by the battery 9 through the line 46, the contacts 156 and the line 55, to close the normally open switches 31 and 32.

Closure of the switches 31 and 32 causes connection of the batteries 9 and 10 and of the load 15 in series between the terminals 11 and 12. Then, the boosting voltage controller 36 operates the load 15 to maintain between the terminals of the battery 2 a boosting voltage of constant voltage value as explained hereinabove. It should be noted here that closure of the contacts 156 also causes energizing of the control coil 153 through a diode 166 to close normally open contacts 154, thereby connecting the positive terminal of the battery 9 to the terminal 59 of the control coil 23 of the load 15 through the line 46, the closed contacts 154 and the line 60, so that the load 15 can be varied by the boosting voltage controller 36 through the line 63 as described in detail in the foregoing description. It should be pointed out here that the load 15 in FIG, 3 is of the same design as the load 15 of FIG. 1, even if some details thereof do not appear on FIG. 3.

Upon occurrence of an overvoltage between the output terminals 11 and 12, the controller 36 opens through its line 72 the normally closed contacts of the relay 39 to de-energize the control coil 155, to open the contacts 156, to de-energize the control coil 30 and open the switches 31 and 32, and to disconnect the batteries 9 and 10 from the output terminal 11.

With the selector switch 140 in its first position, operation of the switch 40 to interconnect the movable blade 47 with the contact 43 ("permanent" position of the switch 40) has the same effect as pushing the blade 47 on the contact 42 ("spring-loaded" position of the switch 40). The only difference is that the coil 159 is not energized through the diode 163, but directly through the line 175.

As can be appreciated, only the battery 9 is connected between the output terminals 13 and 14 when the switches 31 and 32 are closed, In a second position of the selector switch 140 that is when the blade 145 is positioned on the contact 147 and the blade 146 on the free contact 152, operation of the switch 40 to push the blade 47 on the contact 42 causes supply of an input 167 of a polarity checking device 162 with a voltage from the battery 9 through the line 46, the line 166, the blade 47 and contact 42, and the diode 164. If the voltage on the output terminal 11 transmitted to a second input 168 of the device 162 through the line 51 is of the same polarity as the voltage on its input 167, the device 162 energizes through its output 169 a control coil 157 of the relay 143 through the line 170, the contact 147 and the blade 145. The contacts 158 then close and the battery 9 energizes a control coil 171 of a relay 172 through the line 46, the contacts 158 and a line 173. Accordingly, the normally open switch 174 closes to connect the batteries 9 and 10 in parallel between the output terminals 11 and 12 to supply between the latter pair of terminals a direct 12-volt voltage. The batteries 9 and 10 are then also connected in parallel between the output terminals 13 and 14. Operation of the switch 40 to push the blade 47 onto the contact 43 ("permanent" position of the switch 40 ) has no effect as the control coil 159 cannot be energized due to the position (second position) of the selector switch 140.

In a third position of the selector switch 140 in which the blade 145 is connected to the contact 149 and the blade 146 to the contact 150, operation of the switch 40 to push the blade 47 on the contact 42 causes supply of the input 167 of the polarity checking device 162, and if the polarities of the voltage on the inputs 167 and 168 are identical, the device 162 supplies the coil 157 through its output 169, the line 170, the contact 149 and the blade 145. The contacts 158 then close and the coil 171 energized to close the switch 174. Upon closure of the switch 174, the batteries 9 and 10 are connected in parallel between the output terminals 11 and 12 and also between the terminals 13 and 14 to supply between each pair of output terminals a direct 12-volt voltage. If a switch 165, included in the switch device 35, is manually closed while maintaining the blade 47 on the contact 42, the input 177 of the polarity checking device 161 is also supplied and if the polarities of the voltages on the inputs 177 and 180 are identical, the device 161 energizes the coil 155 through its output 178, lines 181 and 182, the contact 150 and the blade 146. The contacts 156 then close to energize the control coil 30 to thereby close the switches 31 and 32. As the switches 31, 32 and 174 are closed, the batteries 9 and 10 are connected in series between the output terminals 11 and 12 to supply between the latter terminals a direct 24-volt voltage, while only the battery 9 is connected between the output terminals 13 and 14.

With the selector switch 140 in its third position, pushing of the blade 47 on the contact 43 has no effect as the coil 159 cannot be energized due to the position of the selector switch 140.

A buzzer 90 (FIGS. 1 and 3) is connected in parallel with the control coil 30 and is therefore activated upon energizing of the latter coil. In the case of FIG. 1, activation of the buzzer 90 indicates supply of a regulated boosting voltage to the battery 2 and load circuit 3, as the coil 30 is energized and the switches 31 and 32 are closed in this situation. In the case of FIG. 3, activation of the buzzer 90 indicates either supply of a regulated boosting voltage to the battery 2 and load circuit 3 or application between the terminals 11 and 12 of a direct 24-volt voltage, as the control coil 30 is energized and the switches 31 and 32 are closed in the two latter situations.

As can be appreciated, the embodiment of the battery booster apparatus shown in FIG. 3 carries out a plurality of modes in which different voltages are applied to the battery 2 and load circuit 3, which modes can be selected in accordance with the requirements of the application.

In somes circumstances, it can be desired to apply simultaneously a boosting voltage to two different batteries. In this case, the battery booster apparatus according to the invention can be duplicated, to the exception of the manual switch device 35, and the batteries 9 and 10.

Although the present invention has been described hereinabove by way of preferred embodiments thereof, it should be pointed out that any modification to these preferred embodiments, within the scope of the appended claims, is not deemed to change or alter the nature and scope of the invention.

What is claimed is:

1. An apparatus for boosting a battery having positive and a negative terminals connected to a load circuit by applying between said positive and negative terminals a direct current boosting voltage of predetermined voltage value via a pair of cables having a predetermined length and respectively connected at one end thereof to said positive and negative terminals, comprising:

input terminal means to be connected to a direct current voltage source means supplying a direct current voltage of value higher than said predetermined voltage value;

output terminal means including two output terminals to be respectively connected to the two cables at the end thereof opposite to said one end;

a high current adjustable load;

circuit means including said input terminal means for connecting the said high current adjustable load in series with the said voltage source means between the two output terminals whereby said voltage source means can supply through said high current adjustable load and said pair of cables both said boosting voltage between the positive and negative terminals of the battery and a direct current to said battery and load circuit; and boosting voltage controller means comprising (a) a first sensor means for detecting the direct current voltage supplied between the two output terminals by said voltage source means, (b) a second sensor means for producing a signal representative of a voltage drop caused in said pair of cables by said direct current, and (c) means for varying said high current adjustable load in accordance with the detected voltage between the two output terminals and the voltage drop representative signal so as to adjust at said predetermined voltage value the boosting voltage applied between the positive and negative terminals of the battery.

2. A battery booster apparatus as defined in claim 1, wherein:

said voltage source means comprises a first and a second direct current voltage sources each provided with a positive and a negative terminals;

said input terminal means comprises two first input terminals to be respectively connected to the positive and negative terminals of the first direct current voltage source, and two second input terminals to be respectively connected to the positive and negative terminals of the second direct current voltage source; and said circuit means comprises a switch system including means for interconnecting said first and second direct current voltage sources and the high current adjustable load in series between the two output terminals when the switching system is in a first switching position.

3. A battery booster apparatus as defined in claim 2, in which:

said first and second direct current voltage sources each supply between its positive and negative terminals a direct current voltage of substantially a same value; and said switch system further comprises means for connecting the first and second direct current voltage sources in parallel between the two output terminals when the switch system is in a second switching position.

4. A battery booster apparatus as defined in claim 2, wherein said switch system further comprises means for connecting the first and second direct current voltage sources in series between the two output terminals when the switch system is in a second switching position.

5. A battery booster apparatus as defined in claim 2, wherein said output terminal means comprises a second pair of output terminals, and wherein said circuit means comprises means for connecting the positive and negative terminals of one of the first and second direct current voltage sources, which is rechargeable, to said output terminals of the second pair, respectively, whereby a service is available through the latter pair of output terminals, and the said one direct current voltage source can be recharged through the output terminals of said second pair.

6. A battery booster apparatus as defined in claim 5, in which said switch system comprises means for connecting the positive and negative terminals of the other of the first and second direct current voltage sources to said output terminals of the second pair, respectively.

7. A battery booster apparatus as defined in claim 1, further comprising polarity checking means (a) for comparing the polarity of the direct current voltage present between said two output terminals to a predetermined polarity, and (b) for preventing application of the direct current boosting voltage between the positive and negative terminals of said battery when the polarity of the voltage between said two output terminals does not correspond to the said predetermined polarity.

8. A battery booster apparatus as defined in claim 1, wherein said output terminal means comprises a second pair of output terminals, and wherein said circuit means comprises means for permanently connecting said output terminals of the second pair to said direct current voltage source means, which is rechargeable, whereby a service voltage is available through said output terminals of the second pair, and the said voltage source means can be recharged through the output terminals of the second pair.

9. A battery booster apparatus as defined in claim 1, wherein:
the high current adjustable load comprises a control coil supplied with direct current to vary said adjustable load;
the first sensor means comprises means for producing a first, feedback voltage signal representative of the value of the direct current voltage between the two output terminals; and
the load varying means of the boosting voltage controller means comprises (a) a generator of reference voltage, (b) means responsive to the voltage drop representative signal from the second sensor means and to said reference voltage for generating a second voltage signal representative of a desired voltage between said two output terminals, (c) comparator means for generating a third voltage signal when the second voltage signal is higher than the first, feedback voltage signal, and (d) a first output stage for supplying with direct current the control coil of said high current adjustable load in response to said third voltage signal.

10. A battery booster apparatus as defined in claim 9, wherein:
the first sensor means comprises means for producing a fourth voltage signal representative of the value of the direct current voltage between the two output terminals; and
the said boosting voltage controller means further comprises an overvoltage protection circuit including (a) a comparator for generating an overvoltage signal when said fourth voltage signal is higher than said second voltage signal, and (b) means for causing disconnection of at least one of said output terminals from the direct current voltage source means in response to the said overvoltage signal.

11. A battery booster apparatus as defined in claim 10, wherein said boosting voltage controller means comprises means for delaying production of said overvoltage signal by said overvoltage signal generating comparator, in order to prevent production of said overvoltage signal when said fourth voltage signal becomes higher than said second voltage signal only during a short period of time.

12. A battery booster apparatus as defined in claim 10, wherein said boosting voltage controller means comprises means for preventing production of said overvoltage signal by forcing said fourth voltage signal to a suitable amplitude when the circuit including said output terminals, said pair of cables and said battery and load circuit is open.

13. A battery booster apparatus as defined in claim 1, in which said high current adjustable load comprises:
a pile of carbon plates;
a control coil supplied with direct current generating a magnetic field; and
a mechanical assembly for applying pressure on the pile of carbon plates in response to said magnetic field.

14. A battery booster apparatus as defined in claim 1, wherein said second sensor means comprises:
a calibrated portion of electric cable responsive to the direct current in the pair of cables to generate a voltage drop proportional to the voltage drop in said pair of cables; and
means for amplifying the voltage drop across the calibrated portion of cable to produce said signal representative of the voltage drop in the pair of cables.

15. A battery booster apparatus as defined in claim 1, further comprising means for manually short-circuiting said high current adjustable load.

16. A battery booster apparatus as defined in claim 1, wherein said circuit means comprises means for damping transcients of the direct current supplied to said battery and load circuit, and transcients of the direct current voltage between said output terminals.

17. A battery booster apparatus as defined in claim 2, wherein said circuit means comprises a resistor connected in parallel with the series connection of the high current adjustable load and of at least one of said direct current voltage sources.

18. A battery booster apparatus as defined in claim 13, in said mechanical assembly of said high current adjustable load comprises a plate assembly through which pressure is applied on the pile of carbon plates, said high current adjustable load further comprising spring means for causing floating of said assembly plate.

* * * * *